United States Patent [19]

Katcher et al.

[11] Patent Number: 4,871,398

[45] Date of Patent: Oct. 3, 1989

[54] METHOD FOR PREGELATINIZED, SPRAY-DRIED STARCH AGGLOMERATES

[75] Inventors: Jay H. Katcher, Cranbury, N.J.; John T. Mabon, Andover, Mass.; Jennifer W. Matherly, Cherry Hill, N.J.; Lawrence T. McCarty, Dover, Del.; Robert E. Schara, Princeton Junction, N.J.

[73] Assignee: General Foods Corporation, White Plains, N.Y.

[21] Appl. No.: 282,403

[22] Filed: Dec. 9, 1988

[51] Int. Cl.[4] .............................................. C08B 30/00
[52] U.S. Cl. ........................................ 127/71; 127/69; 127/32
[58] Field of Search .................... 127/71, 69, 38, 32

[56] References Cited

U.S. PATENT DOCUMENTS

| 3,039,107 | 6/1962 | Bradford | 159/48 |
| 3,083,099 | 3/1963 | Swanson et al. | 159/4.1 X |
| 3,121,639 | 2/1964 | Bauer et al. | 426/471 |
| 3,276,907 | 10/1966 | Huber et al. | 127/71 |
| 4,280,851 | 7/1981 | Pitchon et al. | 127/33 |
| 4,469,712 | 9/1984 | Katcher et al. | 426/579 |

OTHER PUBLICATIONS

Masters, K., Spray Drying, Second Edition pp. 554, 563, 595–596 (Wiley & Sons 1976).

*Primary Examiner*—H. M. S. Sneed
*Assistant Examiner*—Chung K. Pak
*Attorney, Agent, or Firm*—T. R. Savoie; D. J. Donovan

[57] ABSTRACT

A continuous process for producing agglomerated spray-dried, pregelatinized starch wherein two or more spray-cook nozzles are aligned in a drying tower such that their spray patterns intersect. The point of intersection is distant enough from the nozzles to avoid globbing or clumping and close enough to the nozzles so that the surface of the particles are tacky enough to effect adhesion and a build-up of agglomerates.

5 Claims, 2 Drawing Sheets

4,871,398

METHOD FOR PREGELATINIZED, SPRAY-DRIED STARCH AGGLOMERATES

BACKGROUND OF THE INVENTION

Processes for producing spray-dried pregelatinized starch have been disclosed in U.S. Pat. No. 4,280,851 to Pitchon et al. This patent, which is hereby incorporated by reference, discloses a process wherein an aqueous starch slurry is injected through one or more centrally-located atomization apertures in a two-fluid nozzle to form a relatively fine-sized spray. A heating medium (e.g. steam) is also injected through other apertures in the nozzle and into the spray of atomized starch slurry so as to heat the starch to a temperature which is effective to gelatinize the starch. An enclosed chamber surrounds the atomization and heating medium injection apertures and defines a vent aperture which is positioned to enable the heated, atomized starch spray to exit the chamber. The chamber is sized such that the elapsed time for passage of the spray droplets through the chamber (i.e., from the atomization aperture through the vent aperture) is sufficient to effect gelatinization of the starch. The major portion of gelatinization occurs within the chamber; however, some gelatinization may occur upon the exiting of the spray from the enclosed chamber, as a result of the heat and moisture that is carried from the chamber. Thus, gelatinization time includes both time within the chamber as well as the period of time outside of the chamber during which the starch retains a temperature and moisture which can effect gelatinization.

The Pitchon et al. patent further discloses that the spray from the enclosed chamber passes into a spray-drying tower where the spray particles are dried in a stream of heated air. This patent also discloses that a plurality of nozzles may be uniformly-spaced around the top of a single spray-drying tower in order to increase the amount of spray-dried, pregelatinized starch material which is produced. The dried, pregelatinized starch produced in accordance with the Pitchon et al. patent is described as having a mesh size wherein about 80% by weight of the starch passes through a 230 mesh U.S. Standard Screen, with the particles being in the form of loosely-bound agglomerates of starch granules, the granules being in the form of indented spheres and the agglomerates separating into individual granules upon dispersion in water.

The spray-dried starch material produced by the process of the Pitchon et al. patent has been found to contain both an exceedingly wide range of particle sizes and a high percentage of fine particles (e.g., 55% by weight of the particles being less than 53 microns or minus 270 U.S. mesh). It is desirable to produce a spray-dried pregelatinized starch material which has a relatively narrow particle size distribution. Such a material could more readily be optimized to meet the preferred particle size requirements of a given starch-containing, dry mix. It is also desirable to obtain a spray-dried pregelatinized starch material which has a reduced level of fine (minus 270 U.S. mesh) particles. This will improve the dispersibility of the starch when a dry-blended mix containing the starch is mixed with a cold, aqueous fluid, such as when instant pudding mixes ar combined with milk.

Of course, it is known to adjust particle size distribution and reduce the level of fines in a particulate material by means of agglomeration. Fine starch powders are typically agglomerated using balling or tumbling techniques wherein a liquid binder is sprayed onto an agitated bed of dry starch powder. The liquid dissolves the surface of the starch particles and liquid bridges are formed between solid particles which bridges, upon drying, become a solid bond. Such agglomeration techniques, however, require separate agglomeration equipment and processing and thus add to production costs.

SUMMARY OF THE INVENTION

The present invention is directed to a continuous process for producing gelatinized, spray-dried and agglomerated starch which has a relatively narrow particle-size distribution and a relatively low level of fine particles. The objects of this invention are achieved by means of a specially designed spray nozzle system which produces agglomerated, pregelatinized, spray-dried starch without the need for separate agglomeration equipment.

When operating in accordance with this invention it is possible to obtain spray-dried starch material which has a particle size distribution with a reduced level of minus 270 U.S. mesh (i.e., less than 53 micron) particles. The starch material produced in accordance with the spray-drying process of this invention will typically contain agglomerates sized up to about 200 microns. As it is desirable to keep the plus 120 U.S. mesh (above 125 microns) particles to a minimum in order to improve the texture of any pudding-like product containing the starch, it will be desirable to screen out the +120 mesh starch agglomerates. This oversized material may be readily ground using conventional grinding equipment, such as a micropulverizer, an air classifying mill or the like, to a particle size distribution wherein essentially all of the ground material is +270 and −120 mesh. This ground starch material may if necessary, be screened through a 120 U.S. mesh screen and then be combined with the main product stream.

According to this invention, two or more capped, two-fluid nozzles, of the type described in the aforementioned Pitchon et al. patent, are positioned within a spray-drying tower so that their spray patterns intersect at a desired location. The positioning of nozzles must be such that contact of the particles occurs at a location where the particle surface are tacky enough to promote adherence of the particles but not so close to the nozzle vent apertures that globbing or clumping of the starch particles occur.

DETAILED DESCRIPTION OF THE INVENTION

Figure 1:
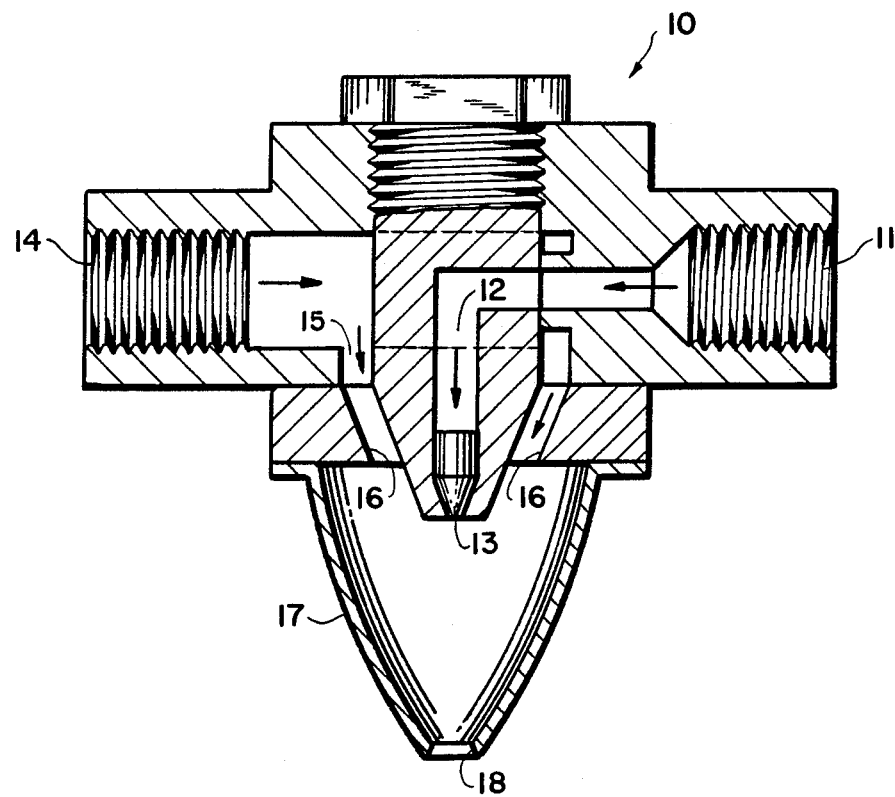
FIG. 1 is an elevational sectional view of a two-fluid nozzle which is useful in this invention.

FIG. 1 illustrates in elevation a cross-sectional view of a two-fluid, capped nozzle 10 which is useful in the practice of this invention. In this embodiment of a nozzle, the aqueous starch slurry, typically having a solids content of from 30 to 42% by weight, enters nozzle 10 through conduit 11 and is first directed radially inwardly and then axially downward through an atomization aperture 12 formed in the central portion of the nozzle 10 into a spinner and orifice 13 arranged in the lower portion of the atomization aperture 12. The spinner and orifice 13 assist in atomizing the material so as to convert the starch slurry into a fine, cone-shaped spray. The viscosity of the uncooked starch slurry is initially low, and this allows for the atomization of the material by such means as a small orifice and spinner, and results in the production of a relatively fine spray. These spray particles will be spherical and typically have a diameter of from about 20 to 200 microns. Steam (or other heating medium) enters through a conduit 14 and enters an annular manifold 15 positioned about the longitudinally-extending atomization aperture 12. The annular manifold is gradually reduced in diameter towards its lower end forming an annular heating medium interjection aperture 16. From the heating medium interjection aperture 16, the steam is interjected into the atomized starch slurry being sprayed from the atomization aperture 12.

A nozzle cap 17 encloses the atomization and heating medium interjection apertures (12 and 16 respectively). The nozzle cap 17 contains a vent aperture 18 which is positioned opposite the atomization and heating medium apertures. The enclosed area between the nozzle cap 17 and the atomization and heating medium apertures forms the enclosed chamber wherein the heating medium is interjected into the spray of atomized starch slurry to gelatinize the starch. The size and shape of the chamber and vent aperture is effective to maintain the temperature and moisture content of the starch for a period of time sufficient to gelatinize the starch. The enclosed chamber maintains a desired temperature and moisture content to enable the starch to be uniformly gelatinized.

Pressures to and flow rates through conduits 11 and 14, as well as the sizing of the apertures and nozzle cap, will be readily determined by those skilled in the art having reference to the aforementioned Pitchon, et al. patent.

Figure 2:
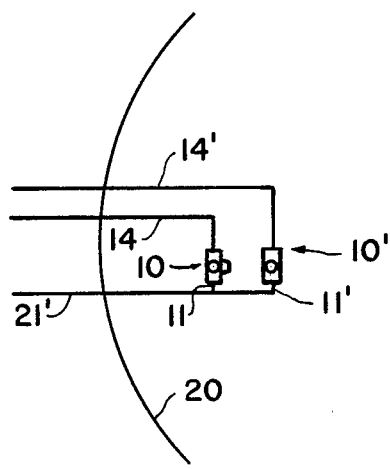
FIG. 2 is a top plan view of two nozzles, of the type shown in FIG. 1, positioned within a circular spray-drying tower.
Figure 3:
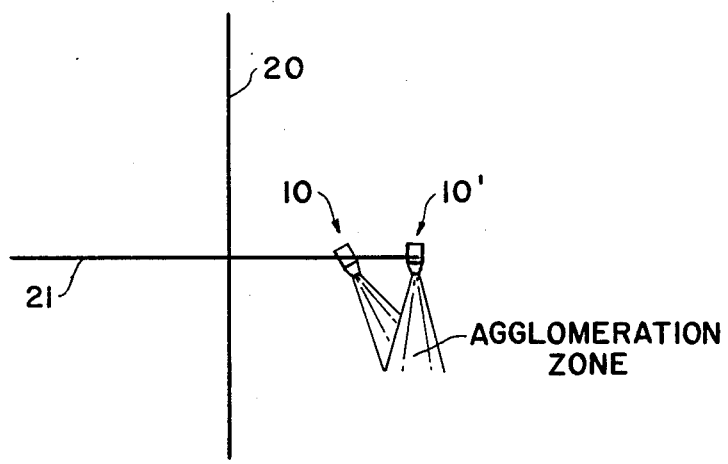
FIG. 3 is an elevational view of FIG. 2 also showing intersecting spray patterns forming an agglomeration zone.

FIGS. 2 and 3 illustrate a single set of two nozzles within a spray-drier. The nozzles 10 and 10' are shown as being positioned at an off-center location within the circular spray-drying tower 20; however, this invention is not limited to this arrangement. A set of nozzles could contain more than two nozzles; however, a set will usually not exceed four nozzles. The spray-drying tower could, depending on its diameter, accommodate a plurality of nozzle sets.

Within a given set of nozzles, the starch slurry may be supplied to each nozzle through a common supply conduit 21. Steam is supplied to each nozzle through one or more steam lines. As shown in FIG. 2, each nozzle 10 and 10' is connected to separate steam lines 14 and 14'. Of course, a single steam line could supply steam to both nozzles provided an adequate amount of steam enter each of the nozzles. Preferably, nozzles are selected which provide full-cone spray patterns, typically having a circular shape. The nozzles are oriented so that the spray patterns fully intersect or overlap. This may be accomplished by angling each of the nozzles toward each other or, as shown in FIG. 3, maintaining one nozzle 10' perpendicular and angling the other nozzle or nozzles within the set. When performing the process of this invention, nozzles within a set should be aligned such that the angle at which the spray patterns intersect is between less than 120 and greater than 30 degrees. Preferably, this angle will be in the range of 45 to 90 degrees. As a result of the agglomeration process of this invention, it has been possible to obtain pregelatinized starch material directly from the spray drier wherein at least 65% by weight of the spray-dried material is between 53 microns (270 U.S. mesh) and 125 microns (120 U.S. mesh) and wherein the spray-dried material is essentially-free of particles smaller than 53 microns (270 U.S mesh).

In accordance with this invention, an atomized spray of gelatinized starch exits the cooking chamber. As the spray particles dry, they develop a tacky, semi-solid surface. It is at this point that the spray patterns are caused to intersect so that contact between the tacky surfaces of the particles causes adhesion by acting as a semi-liquid binder. As drying proceeds, solid bonds are formed between the spray particles. If the spray patterns intersect to soon, wet particles will coalesce leading to dense globs which are both difficult to dry and will not hydrate rapidly enough to be suitable for use in instant food mixes, such as instant puddings. If the spray patterns intersect too late, the particle surfaces will be too dry to effect adhesion and little or no agglomeration will occur.

The agglomerated starch particles which are produced must be strong enough to hold up under conveying, shipping and mixing. The agglomerates, however, must be weak enough that, upon mixing with cold milk or water, they will readily break up and disperse, so that, in the case of an instant pudding mix, the prepared pudding will have a smooth, creamy texture and a glossy surface. Guided by these criteria one skilled in the art will, without undue difficulty, be able to adjust parameters such as the angle of intersection, the temperature of the heated air into which the particles are sprayed and the height of the spray-drying tower in order to obtain the desired spray-dried starch agglomerates. The agglomerates are dried to a moisture content of between 3 and 9% by weight.

This invention is further described but not limited by the following Example.

EXAMPLE 1

A set of two nozzles was mounted in a spray tower. The nozzles, which were of design generally in accordance with the nozzle depicted in FIG. 1, were placed at the same elevation, about 6 inches apart and positioned so that their spray patterns intersected at an angle of 60°. The nozzles were positioned far enough away from the walls of the tower that essentially no spray contacted the tower walls. A corn starch slurry of 40% solids was fed to the nozzles via a high pressure pump at 2500 psig. and at a rate of 2.5 gallons per minute (9.46 l/min) per nozzle. Steam was introduced into the nozzles at 150 psig. The atomization-aperture contained a spinner and orifice having a spinner with 4 grooves of 0.025 inches (0.64 mm) wide and 0.048 inches deep and having an orifice size of 0.042 inches (1.07 mm). The distance between the atomization aperture and the nozzle vent aperture was 0.875 inches (22 mm) with the vent aperture having a diameter of 0.25 inches (6.4 mm).

The spray tower was operated in a co-current manner with an air inlet temperature of 450° F. (232.2° C.), an air outlet temperature of 180° F. (82° C.) and an air flow rate, as measured at the fan exhaust, of 25,000 cubic feet per minute (703.7 cubic meter/min.). The starch exiting the tower had a moisture content of about 5% by weight and a particle size distribution where 66 to 73% by weight of the particles were between 53 and 125 microns, with about 30% by weight of the remaining particles being in excess of 125 microns and with little or no starch smaller than 53 microns. The +125 micron particles were then ground to proper particle size.

By way of comparison a similar run was conducted with both nozzles being and aligned vertically in the tower so that there were no intersecting spray patterns. The resulting dried particles had a particle size distribution wherein only 58 to 64% by weight of the particles were between 53 and 125 microns. Significant amounts of material (about 15 to 25% by weight) was less than 53 microns and about 15 to 20% by weight of the material was in excess of 125 microns.

EXAMPLE 2

An instant pudding mix was prepared as follows:

| Ingredient | Grams |
| --- | --- |
| Sucrose | 75.7 |
| Spray-Dried Starch of Example 1 | 18.0 |
| Sodium Phospate | 3.5 |
| Salt | 0.5 |
| Mono and Diglyceride Emulsifier | 0.5 |
| Vegetable Oil | 0.4 |
| Flavor and Color | 0.6 |

This mix was blended with 473 ml. of cold milk using an electric blender. This mix readily dispersed and the pudding was allowed to set. The resulting pudding had a smooth, creamy texture and a glossy surface appearance.

Having thus described the invention, what is claimed is:

1. A continuous process for the production of a cold-water dispersible, gelatinized, agglomerated and spray-dried starch for use in instant food mixes comprising the steps of:
   (a) atomizing an aqueous starch slurry into a plurality of enclosed chambers, said slurry having a starch solids content of from 30 to 42% by weight, the atomized, spherical particles having a size range of about 20 to 200 microns;
   (b) interjecting steam into the atomized slurry within each enclosed chamber to gelatinize the starch, each chamber containing a vent aperture which is shaped and positioned to enable the atomized mixture to exit the chamber, the size and shape of the chamber and the vent aperture being effective to maintain the temperature and moisture content of the starch for a period of time effective to gelatinize the starch;
   (c) passing a stream of gelatinized starch particles through each of the vent apertures and into a common drying tower, said tower being supplied with a stream of heated air which is effective to dry the starch particles;
   (d) intersecting the flow paths of the streams of gelatinized starch particles exiting the vent apertures at an angle of from 120 to 30 degrees, said intersecting occurring at a position which is spaced far enough from the vent apertures to avoid globbing or clumping of the spray particles and at a position which is close enough to the vent aperture that the surface of the starch particles is still tacky, in order to effect agglomeration of the particles such that the agglomerates of loosely-bound clusters of starch particles are formed;
   (e) continuing to dry the resulting agglomerates to a moisture content of from about 3 to 9% by weight.

2. The process of claim 1 wherein the angle between the intersecting flow paths is between 45 and 90 degrees.

3. The process of claim 1 wherein the spray-dried agglomerates have a particle size distribution wherein more than 65% by weight of the material is between 53 microns and 125 microns.

4. The process of claim 3 wherein the spray-dried agglomerates have a particle size distribution wherein essentially all of the material has a particle size in excess of 53 microns.

5. The process of claim 3 wherein the agglomerated, spray-dried material is screened or classified to separate particles larger than 125 microns, and these separated particles are ground to between 53 and 125 microns and added back.

* * * * *